United States Patent [19]

Boshier

[11] Patent Number: 4,549,207
[45] Date of Patent: Oct. 22, 1985

[54] GAP MEASURING APPARATUS

[75] Inventor: Geoffrey Boshier, Greenbrier, Tenn.

[73] Assignee: Avco Corporation, Nashville, Tenn.

[21] Appl. No.: 597,863

[22] Filed: Apr. 9, 1984

[51] Int. Cl.$^4$ .............................................. H04N 7/18
[52] U.S. Cl. .................................... 358/107; 356/381;
356/387; 358/100; 358/101; 364/563
[58] Field of Search ................. 358/107, 100, 101, 93;
356/375, 381, 384, 387; 364/562, 563

[56] References Cited

U.S. PATENT DOCUMENTS

| 3,229,577 | 1/1966 | Ellinger | 358/100 |
| 4,287,532 | 9/1981 | Moore | 358/107 |
| 4,411,528 | 10/1983 | Newcomb | 356/375 |

Primary Examiner—Howard W. Britton
Attorney, Agent, or Firm—Robert J. McNair, Jr.; Irwin P. Garfinkle

[57] ABSTRACT

Apparatus is disclosed for optically measuring the width of a gap between abutting panel surfaces of a multilayered structure that is to be assembled by bolts or rivets inserted through fastener holes. A scanning video camera having an optical image input and a voltage wavetrain output through a coaxial cable is used. The camera mounts on a rigid side viewing borescope which via sleeve adapters is inserted down the fastener hole under test. A fiber optic bundle within the borescope provides illumination of the test surface containing the gap. The information gathered by the video camera is displayed on a TV monitor mounted in a test console. Superimposed on the camera-obtained image is a pair of vertical cursors generated by a video electronic micrometer. Circuitry is provided to produce a dimensional readout of the spacing between cursors when the leftmost cursor is made to coincide with the left edge of the gap image and the rightmost cursor coincides with the right edge of the gap image being displayed on the monitor. The test console also includes a keyboard and companion electronic circuitry for generating programmed instructions and cataloging measured data.

7 Claims, 7 Drawing Figures

GAP MEASURING APPARATUS

BACKGROUND OF THE INVENTION

This invention relates to apparatus for optically measuring the width of a gap between two abutting panel surfaces as viewed down a fastener hole through which a bolt or rivet will be inserted to secure the panels, one to the other.

Optical displacement and contour measuring are known in the art. U.S. Pat. No. 4,411,528 to Newcomb, et al describes apparatus which projects a circular ring of light on a test surface. The diameter of the circular beam of light varies as a function of the distance of the test surface from an imaginary test surface. The center of the circle varies as a function of the obliquity between the test and reference surfaces.

Borescopes are also known in the art and are commonly used by industry for inspecting such things as aircraft engines and complex pressure vessels.

A manual gap measuring approach is also known in the prior art. Contact type "feeler" gages can be used, their function being to probe down through the previously drilled fastener holes, detect any gap and insert the tip of the gage. The correct thickness gage must be selected or a selection of gages built up to attain the best "contact" fit, rather like measuring spark plug gaps with a kit of feeler gages.

None of the prior art systems disclose a video-optical approach which measures gaps to close tolerances, is easy to set up and use, and provides computer storage of data.

SUMMARY OF THE INVENTION

Highly stressed aerospace vehicle structures such as wings require enhanced life expectancy against fatigue. Gaps between multilayered panels must be reduced to acceptable values before fastener pull-up. Out-of-tolerance gaps between panels create localized stress regions if drawn together by torqueing down threaded bolts. To prevent the occurrence of this stress inducing situation, the gaps between the mating panels can be measured and appropriate shims inserted. Preparation of discrete shims requires gaging through previously drilled fastener holes.

The system which I invented comprises a rigid borescope having fiber optic illumination of the fastener hole wall. A right angle prism at the tip of the borescope probe views the walls of the hole and thereby senses any gap between the multilayered panels. Precision eccentric sleeves provide alignment of the borescope for a variety of hole sizes. Lenses along the centerline of the borescope transmit the image to a high resolution scanning video camera. The output of the video camera is transmitted via coaxial cable to a video monitor which forms a portion of a work station console.

The console operator superimposes electronic cursors from a video micrometer onto the image viewed on the monitoring console. A digital readout is also displayed on the screen representing the measured value of the gap width. A keyboard which is also integral with the console allows information to be added which identifies the location of the hole which is being measured. The entire image presented on the monitoring console can then be stored in a video cassette recorder for future use. Resolution of the gap measuring system is 0.001 inches.

The electronic micrometer superimposes two adjustable vertical cursors over the image of the gap appearing on the monitor. The operator moves the cursors across the face of the monitor by activating two linear potentiometers which resolve to give an empirical value of one cursor with respect to the other.

A video cassette recorder is provided to give a permanent record of the gap as shown on the monitor and to allow off-line measurements to be made if required. To catalog the measured data, the image, and the hole in which the check was conducted, a title address keyboard is used to type information which can be displayed on the monitor. Calibration of the complete system is accomplished with the probe inserted into a block in which a shim of known thickness can be viewed. A calibration adjusting control is provided on the video micrometer.

The equipment is housed in a portable console with an interconnect to the borescope and TV camera of 25 ft of combined cabling and illumination guide. Axial adjustment of the borescope probe into and out of the fastener hole can be made with the rack and pinion drive. To enable the operator to perceive the video image when he is not in close proximity to the console, a small 5 in. monitor is provided which shows the borescope and TV camera in operation.

The total magnification of the gap measuring system reduced to practice is approximately 125 to 1 as viewed on a 14 inch monitoring screen. With this magnification it was found that good interpretation of edge boundary conditions could be obtained.

IN THE DRAWINGS

DESCRIPTION OF THE PREFERRED EMBODIMENT

Figure 1:
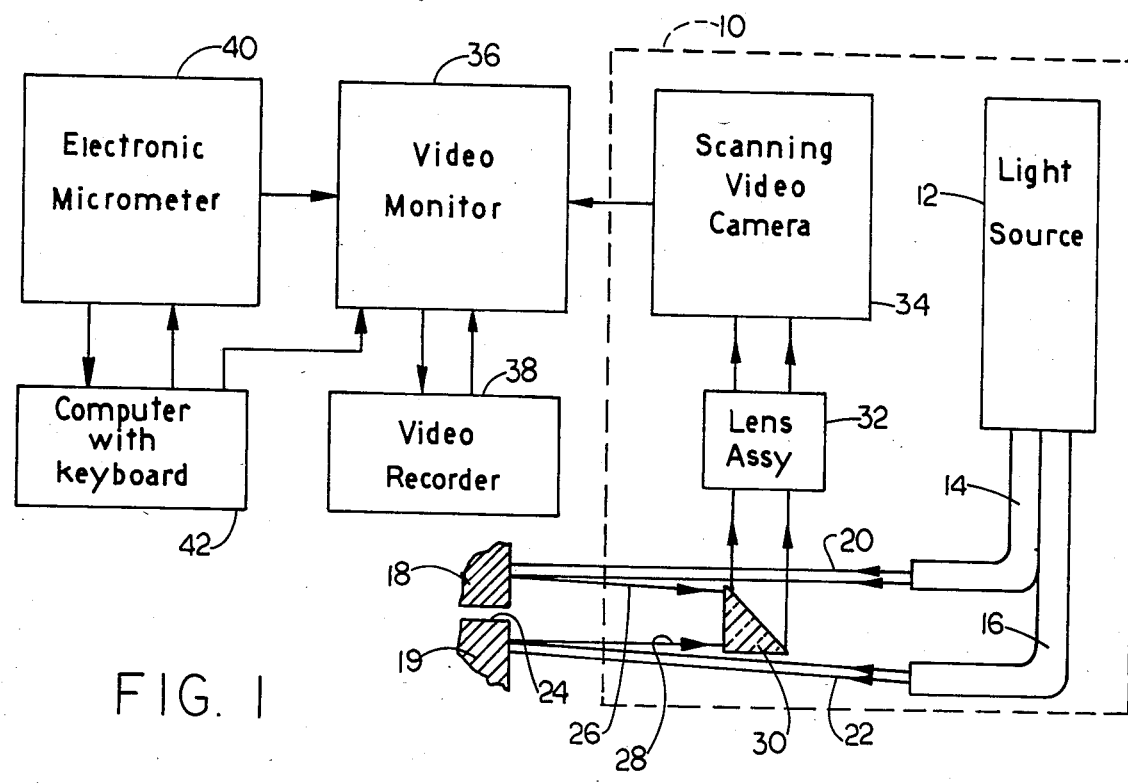
FIG. 1 is a functional block diagram of the gap measuring system.

FIG. 1 shows a functional block diagram of the gap measuring system. Video imaging unit 10 is comprised of a light source 12 which projects white light down fiber optic bundles 14 and 16. Light beams 20 and 22 exit the fiber optic bundles and illuminate test surfaces 18 and 19. Light energy reflected from test surfaces 18 and 19 return along beams 26 and 28 to the surface of prism 30. The reflected light energy is bent at right angles as it leaves the inner surface of the prism and passes through lens assembly 32. A scanning video camera 34 interprets the information passed by lens assembly 32. The processed video signal is a replica of the data pertaining to the view of the test surfaces 18 and 19 together with the air gap 24 separating the two test surfaces. The processed video signal is forwarded to video monitor 36 for viewing. The video signal can also be recorded on video recorder 38.

Cursors from an electronic micrometer 40 are also displayed on video monitor 36. The relative distance of the cursors one to the other are presented as a digital readout on monitor 36. In other words the video micrometer superimposes two adjustable vertical cursors over the video image obtained from imaging unit 10. Movement of the cursors by the operator across the video monitor activates two linear potentiometers within unit 40 which resolve to give an empirical value of the cursor disposition one to the other. A dimensional reading of this value is displayed on the video monitor. The system operator can adjust the relative spacing of the two cursors by means of controls (not shown). In practice the operator will position the cursors so that one of them lies at either edge of the video representation of gap 24 as it appears on the monitor. To correlate the measurements obtained with the identifier given to the specific test surface being measured, the operator can type in information on the console keyboard represented by block 42. When the measured value of the gap and the type-in information are displayed on monitor 36, the operator can store the identifier data together with an image of the gap on video recorder 38.

Figure 2:
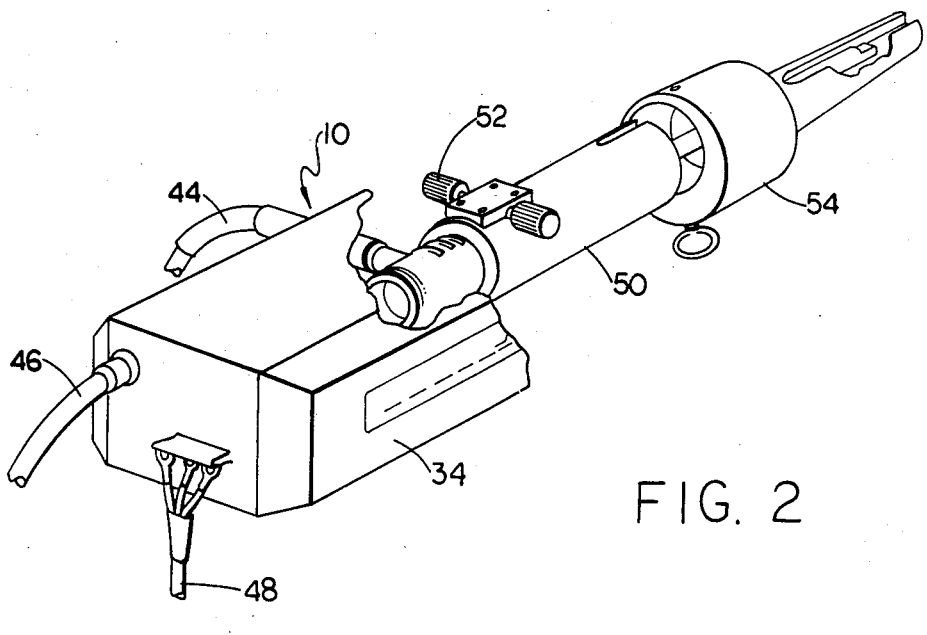
FIG. 2 is a perspective view partially cutaway of the video camera assembly.

Video imaging unit 10 is pictorially shown in FIG. 2. The fiber optic light input from a light source (not shown) is injected via cable 44. The video signal to the monitor is outputted via coaxial cable 46. Cable 48 provides operating power to scanning video camera 34. Borescope 50 is attached to the end of camera 34. A series of imaging lenses are positioned along the centerline of the borescope 50. In the unit reduced to practice fiber optic bundle 44 was split into two parts within borescope 50. A depth adjustment knob 52 allowed the borescope lenses to be properly focused on a target. An eccentric sleeve 54 was used to position the end of the borescope to a specified position within the workpiece.

Figure 3:
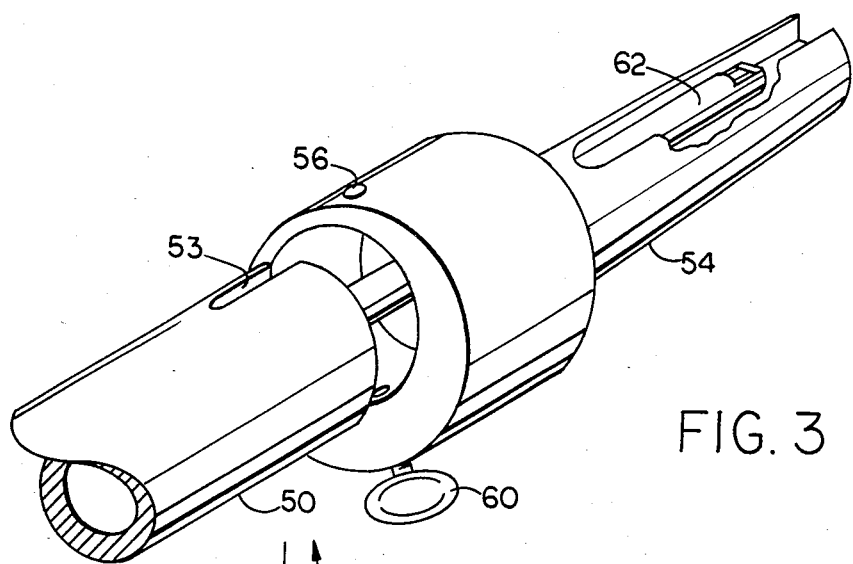
FIG. 3 is an enlarged view of the borescope end of the video camera together with a partially removed eccentric sleeve.

An enlarged view of the eccentric sleeve is shown in FIG. 3. A pin 56 in the barrel of eccentric sleeve 54 allows the sleeve to be properly keyed by means of slot 58 to the borescope. Set screw 60 locks the eccentric sleeve to the borescope. However, the probe portion of the borescope 62 can be slid lengthwise with respect to eccentric sleeve 54 by means of knurled knob 52 shown in FIG. 2.

Figure 4:
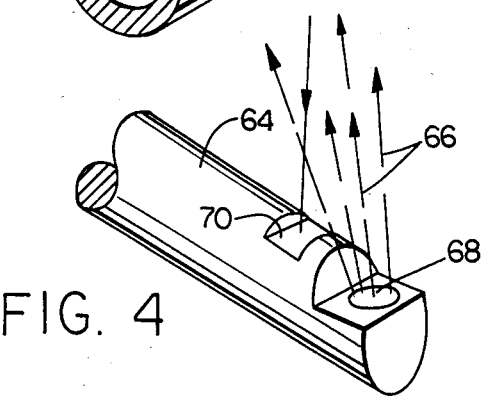
FIG. 4 is a prior art borescope illuminator and receptor.

Prior art borescope probe 64 is shown in FIG. 4. Target illumination 66 results from a coaxial bundle of fibers positioned around the lens imaging tube. Light from the fiber optic system was directed onto the target objective in the rearward projection mode from window 68. Viewing prism 70 received video data from the target. Our tests showed this arrangement of target illumination wherein the light strikes the workpiece at a slant is unacceptable. Illumination from the longitudinally offset position causes shadows to appear at the boundary edges of the target and obscures accurate measurement of the gap.

Figure 5:
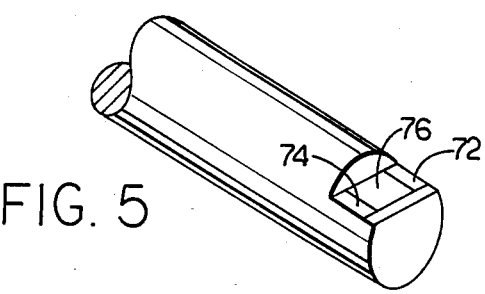
FIG. 5 is a perspective view of the borescope illuminator and receptor used in the system reduced to practice.

FIG. 5 shows the unique borescope probe which was found to function satisfactorily. The light source signal entering fiber optic cable 44 (see FIG. 2) was separated into two equal portions. One-half of the fiber bundle terminated at window 72. The other half of the fiber bundle terminated at window 74. In combination these windows illuminate the target area by projecting a light beam normal with respect to the borescope probe. Reflected light returns to viewing prism 76. Uniform workpiece illumination is achieved with no edge boundary shadows to obscure the data.

Figure 6:
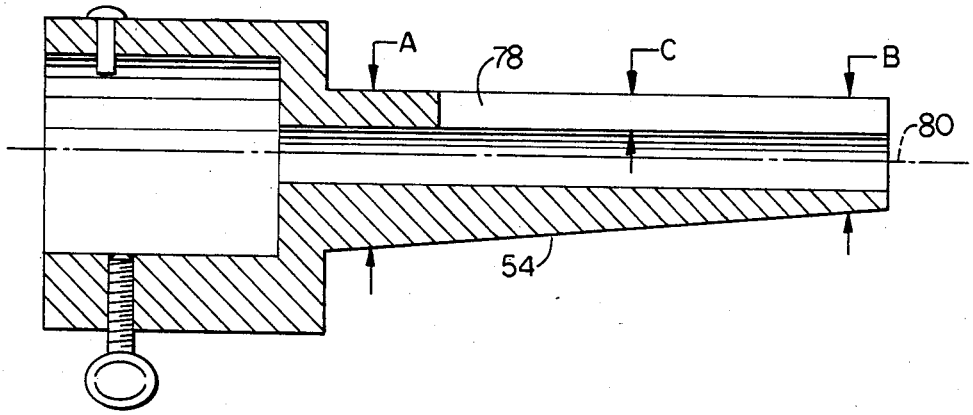
FIG. 6 is an enlarged cross sectional view of an eccentric sleeve used in making measurements within tapered holes.
Figure 7:
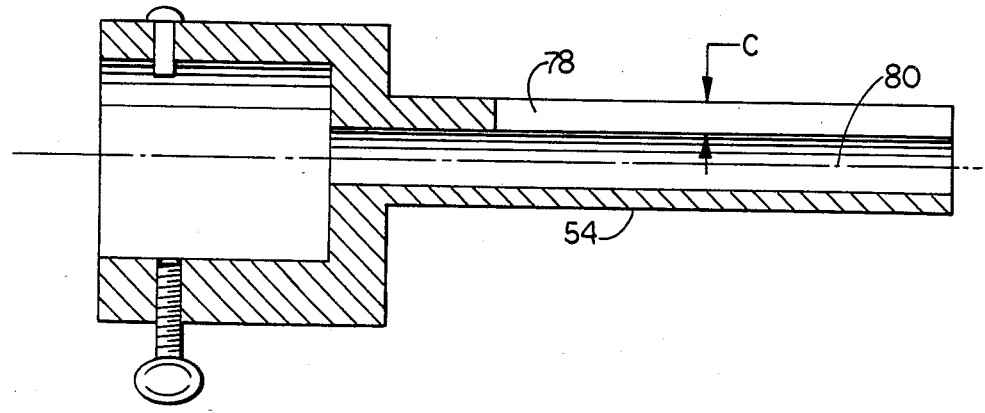
FIG. 7 is a cross sectional view of a sleeve intended for use in a hole of constant diameter.

Cross sectional views of two of the eccentric sleeves are shown in FIGS. 6 and 7. In the FIG. 6 implementation the video imaging unit can be used for obtaining data when probing holes that are drilled in plates to be fastened together by means of tapered bolts. By tapered holes is meant that the diameter of eccentric sleeve 54 is greater at station A than at station B. The need for using an eccentric sleeve comes about because of the need to maintain a constant focal distance from the target objective to the prism on the borescope probe for all hole sizes. In the unit reduced to practice the viewing window of the borescope was arranged to be 0.085 inches from the wall of the hole. This means that the depth of slot 78 has to be maintained constant all along its length. This depth (shown as C in FIG. 6) was kept at 0.085 inches in the units reduced to practice. To accomplish this the centerline 80 of the borescope probe is made parallel to one edge and does not coincide with the centerline of the sleeve. In the FIG. 7 configuration sleeve 54 is one which would be used with a hole of constant diameter. Here, too, the depth C of slot 78 is maintained at the same value as that shown in FIG. 6. The depth of the slot must be sized at a value C in order to keep the probe window at the focal value designed into the system. In order to accomplish this the channel centerline 80 for the borescope probe will not coincide with the centerline of the outside shell. Thus, in order to measure a multitude of hole sizes a complete set of special sleeves must be used, one for each different type of hole.

The length of slot 78 is such that the borescope probe 62 (See FIG. 3) can be moved in and out to all gap locations between the multilayered panels. In the system reduced to practice, eccentric sleeves were configured to allow the borescope to be used for making measurements within holes of 0.375 to 0.750 inches in diameter. Gaps between panels can be measured having widths which range between 0.0005 and 0.075 inches.

It is to be understood that the invention encompasses other optical arrangements for forming shadow free beams of light on the sidewalls of a hole. The specification of the elements in the preferred embodiment is not intended as being limiting. For example, an automatic focusing feature can be added wherein the borescope lens assembly is under closed loop computer control for attaining image enhancement. Changes in the details, material, steps and arrangement of parts which have been described and illustrated to explain the nature of the invention will occur to and may be made by those skilled in the art upon a reading of this disclosure within the principles and scope of the invention. Accordingly, the following claims are intended to protect the invention broadly as well as in the specific form shown.

Having thus described the invention, what is claimed is:

1. Apparatus for optically measuring the width of a gap between abutting panel surfaces of a multilayered structure with gaging being made on the sidewalls of previously drilled fastener holes, said apparatus comprising:
  a video camera having an optical image input and a voltage wavetrain output representing the repetitive scanning of the input optical image;
  a borescope sized for insertion into said fastener holes, said borescope mounted at the input of said video camera and including optical means for observing a test surface on the sidewall of said fastener hole into which said borescope is inserted;

light source means for providing illumination of said test surface including the use of fiber optics to project said light normally onto said test surface;

positioning eccentric sleeve means for providing optical alignment of said borescope with a continuum of specific test surface locations;

video monitoring means for visually displaying the information contained in the voltage wavetrain output of the video camera;

a video micrometer for superimposing two vertical cursors on the camera image displayed on the video monitor, said cursors being movable both with respect to each other and positionally as displayed on said monitor, said micrometer including means for providing a dimensional indication of cursor disposition one to the other; and a control console for generating programmed instructions, cataloging measured data and translating the received information into a measure of the width of the gap between abutting panel surfaces.

2. The invention as defined in claim 1 wherein the control console includes an address keyboard for inserting information for display on the video monitor.

3. The invention as defined in claim 2 including a video cassette recorder having means for recording all information displayed on the monitor.

4. The invention as defined in claim 1 wherein the optical means within said borescope includes a coaxially positioned lens assembly with right angle projection from a viewing prism located in the borescope sidewall adjacent the tip thereof.

5. The invention as defined in claim 4 wherein the means for providing illumination of said test surface includes:

a fiber optic bundle for transmitting the output of a light source, said bundle being separated into two equal first and second portions, one portion of said bundle being positioned on either side of the lens assembly within said borescope, each portion of said bundle traversing the length of said borescope; and a pair of windows in the sidewall of said borescope, one on either side of said viewing prism, one of said windows being the termination of said first portion of said fiber optic bundle, the other window being the termination of said second bundle portion, said windows in combination providing uniform light dispersion radially outward from the tip region of said borescope thereby assuring shadow free image reception at said viewing prism.

6. The invention as defined in claim 1 wherein the positioning eccentric sleeve means includes a slot through which the sidewall of said fastener hole is viewed, said borescope being movable within said sleeve by knurled knob means.

7. The invention as defined in claim 1 wherein the video monitoring means receives data via coaxial cable from the video camera thereby allowing said camera to be moved independently of said control console.

* * * * *